United States Patent [19]
Brassat et al.

[11] 3,875,121
[45] Apr. 1, 1975

[54] ACTIVATED ANIONIC POLYMERIZATION OF LACTAMS

[75] Inventors: Bert Brassat, Krefeld; Klaus Reinking, Wermelskirchen, both of Germany

[73] Assignee: Bayer Aktiengesellschaft, Leverkusen, Germany

[22] Filed: June 22, 1973

[21] Appl. No.: 372,501

[30] Foreign Application Priority Data
June 23, 1972 Germany............................ 2230732

[52] U.S. Cl........... 260/78 L, 260/30.4 N, 260/78 P
[51] Int. Cl.............................................. C08g 20/18
[58] Field of Search......................... 260/78 L, 78 P

[56] References Cited
UNITED STATES PATENTS

| | | | |
|---|---|---|---|
| 2,638,463 | 5/1953 | Ney et al. | 260/78 P |
| 2,739,959 | 3/1956 | Ney et al. | 260/78 P |
| 3,075,953 | 1/1963 | Carlson et al. | 260/78 P |
| 3,575,938 | 4/1971 | Tierney | 260/78 L |
| 3,793,258 | 2/1974 | Reinking et al. | 260/78 L |

*Primary Examiner*—Lucille M. Phynes
*Attorney, Agent, or Firm*—Plumley & Tyner

[57] ABSTRACT

An improved process for the production of polyamides by the activated anionic polymerisation of lactams having at least 6 ring members in the presence of an activator and of a catalytically active solution of an alkali metal or alkaline earth metal lactamate in a solvent mixture of $\alpha$-pyrrolidone and a lactam having at least 7 ring members, the improvement comprises the addition of 0.1 to 25 % by weight of at least one alcohol having 3–21 carbon atoms and 0 to 35 % by weight of at least one carboxylic acid N-alkyl-amide which is liquid at room temperature to said catalytically active solution.

12 Claims, No Drawings

ACTIVATED ANIONIC POLYMERIZATION OF LACTAMS

This invention relates to an improved process for the production of polyamides by the activated anionic polymerisation of lactams.

It is known that lactams can be polymerised to polyamides by heating them in the presence of a strongly basic catalyst and an activator. The catalysts used are generally alkali metal or alkaline earth metal salts of the lactam which is to be polymerised or substances which in contact with molten lactams react to give such salts. The activators used may be acylating agents or N-acylated lactams.

Usually a mixture of lactam and activator and optionally other additives such as pigments, fillers and reinforcing materials and auxiliary substances is melted and headed to the polymerisation temperature. The catalyst is then added, whereupon polymerisation sets in at once. This method may also be reversed, i.e. the activator may be added to the melt which contains the catalyst, but this has the disadvantage that melting and polymerisation must take place in short succession, because the melt begins to polymerise after some time even without addition of the activator.

Melts which contain activator but no catalyst, on the other hand, are stable for an indefinite period of time. They may be prepared in large batches and stored in tanks from which the material can be removed for polymerisation as required. The greatest difficulty is caused by the addition of the catalyst to the melt, since the catalysts are salts and therefore solid substances which must be dissolved in the melt before they can take effect. The rate of solution of the catalyst must be large compared with the rate of polymerisation of the mixture at the given temperature. If this condition is not fulfilled, the polymers obtained are non-homogeneous and contain localised accumulations of undissolved catalyst. There is also the additional difficulty of adding a solid substance with sufficient accuracy to a liquid.

Numerous methods have been attempted to overcome these difficulties, mainly by dissolving the catalyst in a proper solvent. Such catalyst solutions have been described in numerous patents and patent applications. For example solutions of alkali metal lactamates in sulphoxides and in particular in dimethyl sulphoxide are described as suitable catalysts for anionic polymerisation (Belgian Patent No. 706,110; Dutch Patent No. 6,715,660). Since, however, the solvent generally remains in the polymer after polymerisation, the field of application of the products thus obtained is restricted because of the harmful physiological properties of dimethyl sulphoxide. This disadvantage can be overcome by using as solvent a mixture of the lactam which is to be polymerised and certain amines (French Patent No. 406,731; German Offenlegungsschrift No. 1,495,132). The addition of the amines ensures that the lactam which is used as solvent will not start to polymerise under the influence of the catalyst. However, this inhibiting action persists even after the intended polymerisation has been initiated. The polymers obtained by this method therefore have a lower molecular weight and contain increased quantities of residual monomers. Another disadvantage of these catalyst solutions is that they are generally solid at room temperature so that the apparatus through which they are conducted must be heated. This requires an additional technical display which is undesirable because it may cause costs and trouble in the process.

N,N-disubstituted carboxylic acid amides may also be used as solvents for alkali metal lactamates (U.S. Pat. No. 3,575,938). They do not interfere with the polymerisation process but modify the mechanical properties of the polymer in that they tend to soften it, which is in many cases undesirable.

The difficulty of finding solvents which will dissolve alkali metal and alkaline earth metal lactamates at sufficiently high concentrations and neither inhibit the polymerisation reaction nor have an undesirable effect on the properties of the polymer can be overcome by using as catalysts alkali metal salts of C-alkylated lactams which are liquid at room temperature (Belgian Patent No. 661,987). Some of these substances are soluble at relatively high concentrations in hydrocarbons, e.g. in alkylated aromatic hydrocarbons. The quantity of solvent required for these catalysts is so small that the properties of the polymer are practically unaffected and polymerisation is not inhibited. The disadvantage of this process is that C-alkylated lactams are difficult to prepare and expensive.

The difficulties referred to above do not arise if one uses as catalyst a solution of an alkali metal lactamate in a solvent mixture of caprolactam and α-pyrrolidone (German Offenlegungsschrift No 2,035,733), which is liquid at room temperature if the proportion by weight of α-pyrrolidone to caprolactam used is at least 0.4:1 and preferably 0.5:1. The α-pyrrolidone takes part of and is consumed during the polymerisation so that little or no free solvent is left in the polymer. A disadvantage of these solutions is that they must be stored under nitrogen because in air they deposit a solid crust which makes them impossible to circulate through pumps and pipes. A further disadvantage is their high viscosity which may also hinder their delivery through the pumps and pipes and which makes it difficult too add them in the exactly measured quantities which are essential in obtaining a polyamide of reproducible and uniform quality.

It has now surprisingly been found that such solutions are completely unaffected by dry air if small quantities of a higher alcohol are added. The alcohol reduces the viscosity of the catalyst solution to such an extent that there is no difficulty in delivering the solutions and adding them in accurately measured quantities. Surprisingly the alcohol has no influence on polymerisation rate, degree of polymerisation and completeness of polymerisation. No change in the mechanical properties of the polymer can be detected.

If was also found that this stabilising effect of the alcohol is increased by adding a carboxylic acid N-monoalkylamide which is liquid at room temperature to the solution. The quantity of alcohol required is in this case even smaller. The carboxylic acid N-alkylamide does not constitute an undesirable impurity in the polymer since N-substituted carboxylic acid amides act as molecular weight regulators in activated anionic lactam polymerisation (German Offenlegungsschrift No. 1,495,848) and the addition of a molecular weight regulator is in any case generally necessary.

This invention relates to an improved process for the production of polyamides by the activated anionic polymerisation of lactams having at least 5 ring members in the presence of an activator and of a catalytically active solution of an alkali metal or alkaline earth metal lactamate in a solvent mixture of α-pyrrolidone and a lactam having at least 7 ring members, the improvement comprises the addition of 0.1 to 25 % by weight of at least one alcohol having 3 to 12 carbon atoms and 0 to 35% by weight of at least one carboxylic acid N-alkylamide which is liquid at room temperature to said catalytically active solution.

Preferably 0.1 to 15 % by weight of the alcohol and 0.1 to 35 % by weight, most preferably 0.1 to 25 % by weight of the aliphatic carboxylic acid N-alkylamide is added to the catalyst solution to obtain a low viscous and an open air storable solution which can be dosed easily.

Besides the α-pyrrolidone preferably the lactam to be polymerised is used as the second solvent for the catalyst. The ratio of the α-pyrrolidone to the second lactam in the solvent mixture for the lactamates can be found in German Offenlegungsschift No. Offenlegungsschrift 2,035,733.

Suitable alcohols which are liquid at room temperature are those which contain 3 to 12 carbon atoms, preferably 4 to 10 carbon atoms, in the molecule. Representatives of this group of alcohols are inter alia straight and branched-chain alkanols which contain the specified number of carbon atoms. They can be substituted by phenyl groups and have primary, secondary or tertiary OH-groups, ranging from propanol to dodecanol, as well as benzyl alcohol, α-phenyl-ethanaol and β-phenyl-ethanol. Suitable carboxylic acid-N-alkylamides are those which are derived from aliphatic carboxylic acids which contain 1 to 8 and preferably 1 to 4 carbon atoms and in which the N-alkyl group contains 1 to 12 and preferably 1 to 6 carbon atoms. This group includes e.g. N-methyl-propionic acid amide, N-methyl-butyramide, N-methyl-valeramide, N-methyl-oenanth-amide, N-ethylacetamide, N-ethyl-propionamide, N-propyl-acetamide, N-isopropyl-acetamide, N-butyl-acetamide, N-isobutyl-acetamide and N-isohexyl-acetamide.

The catalyst solutions according to the invention preferably contain up to 35 % by weight of alkali metal or alkaline earth metal lactamates.

The activators well known in the art are used for the activated anionic polymerisation like isocyanates such as hexamethylene-1,6-diisocyanate or phenyl isocyanate or blocked isocyanates such as hexamethylene-1,6-bis-(carbamido-caprolactam), ketenes, carbodiimides, acid chlorides, carboxylic acid esters, carboxylic acid imides or triazines.

Lactams which contain at least 5 ring members, such as α-pyrrolidone, caprolactam, lauric lactam, caprylolactam, oenantholactam, the corresponding C-substituted lactams and mixtures of the above mentioned lactams may be polymerised preferably at temperatures of 110° to 300°C by the process according to the invention. Fillers, dyestuffs, pigments and other additives can be added to the polymerisation system.

The catalyst solution according to the invention may be used in continuous and discontinuous polymerisation processes. Preferably they are used for the continuous polymerisation in extruders or injection moulding machines.

EXAMPLE 1

260 g of caprolactam and 300 g of a methanolic solution of sodium methylate which contains 7.85 % of sodium are heated to form a clear solution. 260 g of α-pyrrolidone and 80 ml of n-hexanol are added and the methanol is distilled off under a vacuum at a maximum bath temperature of 50°C. An almost colourless solution is obtained which has a low viscosity and which in the presence of air for several days undergoes no change.

A glass flask with a capacity of 250 ml equipped with gas inlet tube, internal thermometer and stirrer contains a molten mixture of 110 g of caprolactam and 0.4 g of hexamethylene diisocyanated under a nitrogen atmosphere at 80°-95°C. The flask is lowered into an oil bath heated to 220°C and, at the same time, the contents of the flask are stirred. As soon as the reaction temperature reaches 150°C, 2.3 ml of the prepared catalyst solution (corresponding to 0.5 g of sodium lactamate) are pipetted into the reaction mixture and the time taken for the mixture to become unstirrable is measured. This is listed below under the heading "polymerisation time" and is a measure of the rate of polymerisation. The reaction mixture is then left to cool in air, the flask is broken and the polymer is broken up into small pieces. The extract content is measured by the method given in Kunststoffhandbuch (publishers: R. Vieweg) Vol. 6 "Polyamide", chapter 4.7. This is a measure of the completeness of polymerisation.

| | |
|---|---|
| Polymerisation time | 90 – 100 sec |
| Extract content | 6.0 – 6.3 % |

EXAMPLE 2

A 250-ml glass flask equipped with gas inlet tube, internal thermometer and stirrer contains a molten mixture of 160 g of ω-lauric lactam and 0.3 g of hexamethylene diisocyanate under an atmosphere of nitrogen. The temperature is kept at 160°–165°C by an oil bath. When 2.0 ml of the catalyst solution prepared as described in Example 1 are added, the melt polymerises within 30 seconds to 12-polyamide which still contains 1.2 % of monomeric lauric lactam.

EXAMPLE 3

185 g of caprolactam are dissolved by heating in 150 g of a methanolic sodium methylate solution which contains 7.85 % of sodium. 86 g of N-butyl acetamide, 165 g of α-pyrrolidone and 40 g of 2-ethyl hexanol are added and the methanol is distilled off at 10 mm Hg and a maximum bath temperature of 50°C. A colourless, highly fluid solution which has an alkali metal content of 14 % (calculated as sodium caprolactamate) is obtained.

The solution is tested for its catalytic activity as in Example 1, using 3.7 ml of the solution. The polymerisation time measured is 80–90 sec and the extact content of the resulting 6-polyamide is 6.0 %.

EXAMPLE 4

The polymerisation apparatus used is a double-screw extruder with screws 50 mm in diameter and 250 cm in length. Its intake zone is headed with oil to keep it at a temperature of 190°C. The rest of the cylinder is uniformly heated to 220°C. An extrusion die heated to 230°C is used.

The extruder is charged continuously with a melt of 110 parts by weight of caprolactam and 1 part by weight of hexamethylene-1,6-bis-(carbamido-caprolactam) kept at 100°C from a delivery pump which delivers at the rate of 33 kg per hour. At the same time, the catalyst solution described in Example 3 is introduced into the intake zone from a second pump delivering at the rate of 1050 g per hour.

The polyamide line thus obtained is cooled in water, granulated, dried and freed from residual monomers by extraction. The relative viscosity of the polymer is 2.7 (determined in m-cresol; c = 1 g per 100 ml).

EXAMPLE 5

128 g of caprolactam and 128 g of α-pyrrolidone are dissolved in 75 g of methanolic sodium methylate solution (7.85 % sodium) with mild heating to prepare the catalyst solution. 2-ethyl hexanol and N-butyl acetamide are added in the quantities shown in the table and the methanol is distilled off at 10 mm Hg and a maximum bath temperature 50°C. The following table shows the stability (30 days storage at room temperature) and catalytic activity of the various solutions.

Table 1

| 2-ethyl-hexanol g | N-butyl-acetamide g | Polymerisation time in seconds[+] | Stability |
|---|---|---|---|
| — | — | 80 – 90 | formation of crust within 30 seconds |
| 5 | — | 90 – 80 | without clouding stable for 3 days |
| 10 | — | 70 – 85 | without clouding stable for 20 days |
| 20 | — | 80 – 90 | without clouding stable for 25 days |
| 40 | — | 85 – 95 | stable |
| 5 | 80 | 80 – 90 | stable |
| 10 | 80 | 80 – 90 | stable |
| 20 | 80 | 80 – 90 | stable |
| 40 | 80 | 80 – 90 | stable |

[+]determined with 2 ml catalyst solution by the method described in Example 1.

EXAMPLE 6

185 g of caprolactam and 100 g of α-pyrrolidone are dissolved in 200 g of methanolic sodium methylate solution (5.90 % sodium) with mild heating to prepare the catalyst solution. 40 g of 2-ethyl hexanol and 0.75 mol of the molecular weight regulators shown in Table 2 are added and the methanol is distilled off at 10 mm Hg and a maximum bath temperature of 50°C. The resulting solutions are tested for their catalytic activity in activated anionic polymerisation by the test method described below.

The polymerisation apparatus described in Example 1 contains a melted mixture of 110 g of caprolactam and 0.4 g of hexamethylene diisocyanate at 75°–80°C under an atmosphere of nitrogen. The flask is lowered with stirring into an oil bath which is kept at a temperature of 220°C. As soon as the temperature of the reaction mixture reaches 100°C, 2.5 ml of the catalyst solution are introduced with a pipette and the time taken for the mixture to become unstirrable is measured. This is a measure of the rate of polymerisation. The table below shows the times measured up to the polymerisation and the stability of the various solutions (30 days storage at room temperature).

Table 2

| Regulator | Time up to polymerisation | Stability |
|---|---|---|
| N-butyl-acetamide | 3 min 10 sec | stable |
| N-isohexyl-acetamide | 3 min | stable |
| N-propyl-acetamide | 3 min 15 sec | stable |
| N-acetyl-2-ethyl-hexylamine | 3 min 20 sec | 6 days stable without change |
| N-ethyl-propionamide | 3 min | stable |
| N-methyl-oenanthamide | 3 min 10 sec | 3 days stable without change |

EXAMPLE 7

A catalyst solution is prepared in the manner described in Example 5 from 128 g of caprolactam, 128 g of pyrrolidone, 75 g of methanolic sodium methylate solution (7.85 % sodium) and 40 g of one of the alcohols shown in Table 3. The polymerisation activity is determined by the method described in Example 6. The times measured and stability of the solutions (30 days storage at room temperature) are shown in the following table.

TABLE 3

| Alcohol | Time up to polymerisation | Stability |
|---|---|---|
| none | 3 min 10 sec | formation of crust within 30 sec |
| n-butanol | 3 min 20 sec | stable |
| sec. butanol | 3 min 10 sec | stable |
| 2-ethyl-hexanol | 3 min 10 sec | stable |
| n-decanol | 3 min 10 sec | 20 days stable without change |
| benzyl alcohol | 3 min 30 sec | stable |

EXAMPLE 8

125 g of caprolactam and 125 g of α-pyrrolidone are successively dissolved in 330 g of a 17.7 % solution of potassium methylate in methanol to prepare the catalyst. The methanol is distilled off at 10 mm Hg and a bath temperature of 50°C, potassium lactamate crystallising in the form of shiny flakes which dissolve when heated after adding 140 g of a mixture of equal parts of caprolactam and pyrrolidone. The solution is highly ciscous and its catalytic activity is tested in the manner described in Example 1, using 2.0 ml of the solution. The polymerisation time measured is 80–90 sec. The addition of 40 ml of 2-ethyl-hexanol lowers the viscosity of the solution without significantly altering the polymerisation time.

EXAMPLE 9

The polymerisation apparatus used is a rotational moulding tool comprising an air-heated mould which can be rotated simultaneously about two mutually perpendicular aces and which has approximately the form of a block with rounded edges measuring 13 × 17 × 23 cm. The mould is composed of two halves which are screwed together by flanges. It also has a feed opening which can be closed.

The empty mould is preheated in an air bath at 220°C for 12 minutes. It is then charged with a melt of 500 g of caprolactam and 2.4 g of hexamethylene diisocyanate which has been preheated to 110°C. After the addition of 15 ml of catalyst solution described in Example 3, the mould is closed. It is rotated for 3 minutes in an air bath at 220°C, the ratio of speeds of rotation about the two axes being 30:12. After cooling, the two halves of the mould are separated and the hollow moulded product is removed. It consists of a polyamide which has a relative viscosity of 3.2 (determined in m-cresol; c = 1 g/100 ml).

EXAMPLE 10

14.5 g of sodium caprolactamate (25% by weight based on the total quantity) are dissolved in 43.7 g of a mixture of 130 g of caprolactam, 120 g of α-pyrrolidone, 86 g of N-butyl-acetamide and 40 g of 2-ethyl-hexanol with stirring and mild heating. When kept in contact with dry air at room temperature, the solution remains unchanged for at least 30 days. When its polymerisation activity is determined by the method described in Example 1, the polymerisation time is found to be 70–90 sec and the extract content is 5.9–6.3%.

EXAMPLE 11

The polymerisation apparatus used is the double screw extruder described in Example 4. It is fed with a melt of 110 parts by weight of caprolactam and 0.4 parts by weight of hexamethylene diisocyanate through a pump which delivers 30 kg per hour. The temperature of the melt is 100°C. At the same time, a second pump delivers a catalyst solution of the following composition from a flask in which it is stored in contact with dry air into the intake zone at a rate of 546 g per hour:

25,7 parts by weight of caprolactam
26,2 parts by weight of α-pyrrolidine
18,8 parts by weight of N-butylacetamide
8,7 parts by weight of 2-ethyl hexanol
20,6 parts by weight of sodium caprolactamate The proceeding is the same as in Example 4. Every 30 minutes a 50 gram sample of the produced polyamide granulate is taken and its relative viscosity and extract content are determined. During a 6 hours run of the extruder the following values were obtained:

| relative viscosity | 3,11 | 3,09 | 3,09 | 3,13 | 3,09 | 3,10 | 3,11 | 3,10 | 3,09 | 3,08 | 3,10 | 3,09 |
| --- | --- | --- | --- | --- | --- | --- | --- | --- | --- | --- | --- | --- |
| extract content in percents | 8,9 | 8,4 | 9,0 | 8,9 | 8,9 | 8,7 | 8,7 | 8,6 | 8,7 | 8,8 | 9,0 | 9,1 |

EXAMPLE 12

The experiment is performed on the extruder described in Example 11, using a catalyst solution of the following composition:

25,7 parts by weight of caprolactam
26,2 parts by weight of α-pyrrolidone
20,6 parts by weight of sodium caprolactamate which is fed into the intake zone at a rate of 396 g per hour from a flask in which it is stored in contact with dry air. A lactam melt kept at 100°C containing 0.4 parts by weight of hexamethylene diisocyanate and 0,38 parts by weight of N-butyl acetamide per 110 parts by weight of caprolactam is fed into the intake zone at a rate of 30 kg per hour. The proceeding is the same as in Example 11. In an attempted 6 hours run, the following values were measured:

| Relative viscosity | 3,02 | 3,14 | 3,26 | 2,91 | 2,40 |
| --- | --- | --- | --- | --- | --- |
| Extract content in percents | 8,7 | 8,9 | 8,9 | 10,2 | 14,6 |

After 2½ hours, the catalyst solution pump failed because it was plugged up by solid particles from the solution. The precipitate could not be redissolved by heating.

EXAMPLE 13

A melt of 110 g of caprolactam and 0,4 g of hexamethylene diisocyanate was polymerised at 170°C while stirring in a glass flask under a blanket of nitrogen by adding 2,5 g of the catalyst solution described in Example 11. After completion of the polymerisation reaction, the flask was broken and the polyamide block obtained was divided into eight equal parts, each of which was examined for its relative viscosity. The following values were obtained:

2,98 / 2,95 / 3,00 / 3,04 / 2,98 / 2,97 / 3,06 / 2,97

EXAMPLE 14

The experiment described in Example 13 was repeated with a catalyst solution of the following composition:

39,0 parts by weight of caprolactam
40,4 parts by weight of α-pyrrolidone
20,6 parts by weight of sodium caprolactamate This solution had been stored before under dry air for 10 days and during this time become unhomogeneous by separating solid crusts of unknown composition. Before adding the catalyst solution, 0.46 g of N-butyl acetamide were added to the caprolactam/hexamethylene diisocyanate melt. The following relative viscosity values were obtained from the different parts of the polyamide block:

2,95 / 3,14 / 3,16 / 2,31 / 2,47 / 2,82 / 2,91 / 3,10

We claim:
1. In a process for the production of polyamides by the activated anionic polymerization of lactams having at least 5 ring members wherein the lactam melt is polymerized in the presence of an activator and of a catalytically active solution of an alkali metal or alkaline earth metal lactamate in a solvent mixture selected from the group consisting of (1) a mixture of α-pyrrolidone and of maximal 50% by weight of ε-caprolactam; (2) a mixture of α-pyrrolidone and of maximal 7% by weight of lauriclatam; and (3) a mixture of α-pyrrolidone and of maximal weight 38% by weight of capryllactam, the improvement comprising adding 0.1 to 25% by weight of at least one carboxylic acid N-alkyl-amide which is liquid at room temperature to said catalytically active solution which in turn is added to said lactam melt containing the activator.

2. A process as claimed in claim 1, wherein 0.1 to 15 % by weight of said alcohol are added.

3. A process as claimed in claim 1, wherein 0.1 to 35 % by weight of said carboxylic acid N-alkylamide are added.

4. A process as claimed in claim 2, wherein 0.1 to 35 % by weight of said carboxylic acid N-alkylamide are added.

5. A process as claimed in claim 1, wherein 0.1 to 25 % by weight of said carboxylic acid N-alkylamide are added.

6. A process as claimed in claim 2, wherein 0.1 to 25 % by weight of said carboxylic acid N-alkylamide are added.

7. A process as claimed in claim 1, wherein an alcohol having 4 to 10 carbon atoms is added.

8. A process as claimed in claim 1, wherein a straight- or branched chain alkanol is added.

9. The process of claim 1 wherein the alcohol contains from 3 to 12 carbon atoms.

10. A process as claimed in claim 1, wherein the carboxylic acid N-alkylamide is derived from a carboxylic acid having 1–8 carbon atoms and the N-alkyl group contains 1 to 12 carbon atoms.

11. A process as claimed in claim 1, wherein the carboxylic acid N-alkylamide is derived from a carboxylic acid having 1–4 carbon atoms and the N-alkyl group contains from 1–6 carbon atoms.

12. A process as claimed in claim 1, wherein as carboxylic acid N-alkylamide is added N-methyl-propionic acid amide, N-methyl-butyramide, N-methyl-valeramide, N-methyl-oenanthamide, N-ethyl-acetamide, N-ethyl-propionamide, N-propyl-acetamide, N-isopropyl-acetamide, N-butyl-acetamide, N-isobutyl-acetamide and N-isohexyl-acetamide.

* * * * *